United States Patent Office 3,767,640
Patented Oct. 23, 1973

3,767,640
STREPTOZOTOCIN DERIVATIVES AND PROCESS FOR PREPARING THE SAME
Tetsuo Suami, Tokyo-to, and Tomoya Machinami, Shiraoka-machi, Japan, assignors to Tetsuo Suami
No Drawing. Filed Apr. 19, 1971, Ser. No. 135,476
Claims priority, application Japan, Apr. 25, 1970, 45/35,523
Int. Cl. C07c 47/18
U.S. Cl. 260—210 R                    3 Claims

ABSTRACT OF THE DISCLOSURE

Methyl-D-glucosaminide or a salt thereof is condensed with methyl isocyanate to produce methyl N-(N'-methyl-carbamoyl)-D-glucosaminide which is then treated with a nitroso compound. Methyl N-(N'-nitrosocarbamoyl)-D-glucosaminide is produced. Optimally, the condensation reaction is carried out in an aqueous solution and at a temperature of 50–150° C. When an acid addition salt of methyl D-glucosaminide is employed the condensation reaction is preferably carried out in the presence of a base and an aqueous solution. When nitrous acid, an alkali salt of nitrous acid or an alkyl nitrite is employed as the nitroso compound the treatment with the nitroso compound is carried out preferably in the presence of an acid and at a temperature of −5 to 10° C. The compounds of the invention exert a tumor inhibitory effect on mice and rats. They are substantially free of diabetogenic side effects.

This invention relates to novel streptozotocin derivatives and a process for preparing the same. More particularly, it relates to methyl N-(N'-methyl-N'-nitroso-carbamoyl)-D-glucosaminide and its α-type or β-type anomers.

The streptozotocin derivatives are represented by the following formula:

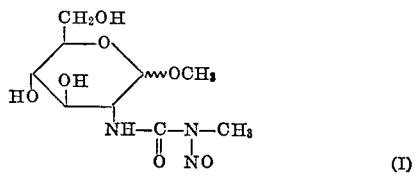

(I)

Streptozotocin (Chemical name: N-(N'-nitroso-carbamoyl-D-glucosamine) is an antibiotic which was isolated from the fermentation broth of a strain of *Streptomyces achromogenes* var. 128 (Antibiotics Annual, 1959–1960, 230–240 (1960)). This antibiotic is known to be active against some kinds of tumor such as Ehrlich carcinoma, Leukemia L–1210 and Walker 256 carcinosarcoma. However, use of streptozotocin as an anti-tumor agent is not recommendable because of its significant diabetogenic activity which can be observed in experimental animals and also in human beings. For instance, when streptozotocin was injected intravenously to Wistar male rats of body weight 220–250 g. at a dose of 50 mg./kg., the blood sugar values of the rats increased to a level of approximately 370 mg./dl. after 2 days of the injection, while the values of the untreated rats were at a level of about 150 mg./dl.

We have now found that the streptozotocin derivatives (I) have potent anti-tumor activity against Ehrlich's ascites carcinoma, sarcoma S–180, leukemia SM–36 and the solid type of Ehrlich's carcinoma in mice and rats. Moreover, unlike those of streptozotocin, the streptozotocin derivatives (I) is substantially free from the diabetogenic activity or other unfavorable side effects even at the dose of 50 mg./kg. For instance, the anti-tumor activity of methyl N-(N'-methyl-N'-nitroso-carbamoyl)-α or β-D-glucosaminide against ascites tumors and the solid type of Ehrlich carcinoma in mice are respectively shown in Tables 1 and 2. The experiments were carried out according to Sugiura's method (Cancer Research 27, 179 (1967)).

Anti-tumor activity against ascites tumors

Each of the test compounds was injected intraperitoneally to tumor-implanted mice for 5 successive days. The daily dose which enabled the tumor-implanted mice to survive at least twice as long as a control group of tumor-implanted mice was evaluated as the minimum effective dose.

TABLE 1
Minimum effective dose (mg./kg./day)

| Compound | Tumors | | |
| --- | --- | --- | --- |
| | Ehrlich ascites carcinoma | Sarcoma S–180 | Leukemia SM–36 |
| Methyl N-(N'-methyl-N'-nitroso-carbamoyl)-α-D-glucosaminide | 12.5 | 6.3 | 25.0 |
| Methyl N-(N'-methyl-N'-nitroso-carbamoyl)-β-D-glucosaminide | 12.5 | 3.2 | 6.3 |

Anti-tumor activity against the solid type of Ehrlich carcinoma

Each of the test compounds was injected intraperitoneally to tumor-bearing mice for 5 successive days. After 14 days of the treatment the tumor-weights of the treated mice were compared with that of untreated mice and the inhibition degrees of tumor were measured.

TABLE 2
Inhibition degree (percent)

| Compound | Daily dose per kg. | |
| --- | --- | --- |
| | 50 | 25 |
| Methyl N-(N'-methyl-N'-nitroso-carbamoyl)-α-D-glucosaminide | 16 | 3 |
| Methyl N-(N'-methyl-N'-nitroso-carbamoyl)-β-D-glucosaminide | 75 | 40 |

The effect of methyl N-(N'-methyl-N'-nitroso-carbamoyl)-β-D-glucosaminide on the blood sugar level in rats is shown in Table 3.

Effect on the blood sugar values

Each of the test compound was injected intraperitoneally to S.D. male rats of body weight 220 g. After the injection, 0.02 ml of blood was collected from the tail vein. The blood was hemalyzed with 0.88 ml. of distilled water. 0.05 ml. of 5% aqueous zinc sulfate solution and 0.05 ml. of 5% aqueous barium hydroxide are added to the solution. The mixture is centrifuged. To 0.5 ml. of the supernatant solution is added 0.5 ml. of an alkaline solution of 3,6-dinitrophthalic acid. The mixture is heated for 10 minutes on a water bath of 100° C. 4.0 ml. of distilled water is added to the mixture. The blood sugar value was measured from the optical density of the mixture at the wave length of 450 mμ.

carbon atoms, strong cation exchange resin-adsorption procedures, freeze-drying or a combination of these procedures may be preferably employed for this purpose.

TABLE 3

Blood sugar values (mg./dl.)

| Compound | Dose (mg./kg.) | Time after the injection | | | | | | |
|---|---|---|---|---|---|---|---|---|
| | | 0 hr. | 2 hrs. | 4 hrs. | 7 hrs. | 24 hrs. | 2 days | 6 days |
| Methyl-N-(N'-methyl-N'-nitroso-carbamoyl)-β-D-glucosaminide | {10 | 72.4 | 66.4 | 64.6 | 74.8 | 69.0 | 147.2 | 99.6 |
| | {50 | 73.2 | 61.4 | 67.8 | 71.2 | 76.4 | 159.0 | 95.8 |
| Control | | 73.6 | 60.0 | 58.4 | 70.4 | 57.8 | 151.2 | 111.8 |

Toxicity of the streptozotocin derivatives (I) of the present invention is considerably low. For instance, no mice died when methyl N-(N'-methyl-N'-nitroso-carbamoyl)-β-D-glucosaminide was administered intraperitoneally at a daily dose of 400 mg./kg. for 5 days.

According to the present invention, methyl N-(N'-methyl-N'-nitroso-carbamoyl)-α- or β-D-glucosaminide can be prepared by condensing methyl α- or β-D-glucosaminide (II) with methyl isocyanate, and treating the resultant methyl N-(N'-methyl-carbamoyl)-α- or β-D-glucosaminide (III) with a nitroso compound. Obviously, the mixture of α-type and β-type anomers of the objective compound can be prepared in the similar manner using the mixture of α-type and β-type anomers of the starting compound.

The above mentioned reactions of the invention are represented by the following scheme:

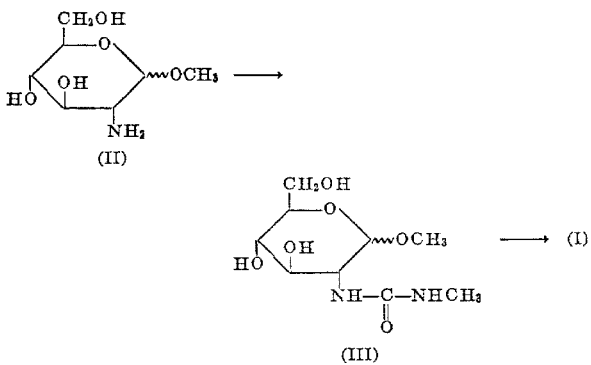

The condensation reaction may be accomplished by heating a solution of methyl α- or β-D-glucosaminide and methyl isocyanate in an inert solvent at 50° to 150° C., particularly at about 80° C. Water and a mixture of water and acetonitrile, chloroform or benzene are suitable as the reaction solvent. The starting compound (II) may be employed either in a free base or in the form of a salt with a conventional acid such as hydrochloric acid, hydrobromic acid and sulfuric acid. When an acid addition salt of the compound (II) is employed as one of the starting compounds, it is preferred to carry out the reaction in the presence of a base. Suitable examples of such base are magnesium carbonate, magnesium oxide, silver oxide, silver carbonate, pyridine and triethylamine.

The subsequent nitroso-substitution reaction may be performed by treating the compound (III) with nitrous acid, an alkali salt thereof (e.g., sodium salt, potassium salt) or an alkyl nitrite (e.g., amyl nitrite) in the presence of an acid (e.g., hydrochloric acid, sulfuric acid or acetic acid). Alternatively, it may be performed by treating the compound (III) with nitrosyl chloride in a suitable solvent (e.g., pyridine or a mixture of sodium acetate and acetic acid). In both cases, it is preferred to carry out the reaction at −5° to 10° C., particularly at 0° to 5° C.

The streptozotocin derivatives (I) of the invention thus obtained is then subjected to a purification procedure. Direct crystallization from an alkanol of one to three carbon atoms, strong cation exchange resin-adsorption procedures, freeze-drying or a combination of these procedures may be preferably employed for this purpose.

The streptozotocin derivatives (I) of the present invention may be incorporated within a pharmaceutical preparation in conjunction with or admixed with a pharmaceutical excipient that is suitable for enteral or parenteral administration. Excipients which do not react with the streptozotocin derivatives (I) should be selected. Gelatin, lactose, glucose, sodium chloride, starch, magnesium stearate, talcum, vegetable oils, benzyl alcohol, gums are suitable. Other known medicinal excipients may be employed. The pharmaceutical preparation may be, for example, a solution, a suspension or an emulsion. The pharmaceutical preparation may be sterilized and/or may contain auxiliaries, such as preserving, stabilizing, wetting or emulsifying agent. The pharmaceutical preparation may further contain other therapeutically valuable substances.

Practical and presently preferred embodiments of the present invention are illustratively shown in the following examples.

EXAMPLE 1

735 mg. of methyl α-D-glucosaminide hydrochloride are dissolved in 15 ml. of water, and 30 ml. of acetonitrile are added to the solution. 200 mg. of methyl isocyanate and 432 mg. of silver carbonate are added to the solution. The mixture is refluxed on a water bath for 45 minutes under heating. The reaction mixture is filtered to remove insoluble materials. The filtrate is concentrated under reduced pressure. The residue thus obtained is recrystallized from ethanol. 494 mg. of methyl N-(N'-methyl-carbamoyl)-α-D-glucosaminide are obtained. Yield: 65%. M.P. 182–188° C. The product is further recrystallized from n-propanol to give the crystals melting at 188–191° C. $[\alpha]_D^{23}$ +97.5° (c.=1, $H_2O$).

Analysis calculated for $C_9H_{18}N_2O_6$ (percent).—C, 43.19; H, 7.25; N, 11.20. Found: C, 42.53; H, 7.51; N, 10.95.

400 mg. of the crystals are dissolved in 10 ml. of water, and 3.0 ml. of glacial acetic acid are added to the solution. 3.8 ml. of an aqueous 0.5 N-sodium nitrite solution are added dropwise to the solution under ice-cooling. The solution is allowed to stand overnight in a refrigerator. Then, 10 ml. of strong cation exchange resin (H-form) (manufactured by Rohm & Haas Company under the trade name "Amberlite IR–120") are added to the solution. The mixture is stirred for 20 minutes. The ion exchange resin is removed by filtration and the filtrate is lyophilized. The crude crystals thus obtained are recrystallized from ethanol. 214 mg. of methyl N-(N'-methyl-N'-nitroso-carbamoyl)-α-D-glucosaminide are obtained as needles. Yield: 48%. M.P. 129–133° C. $[\alpha]_D^{25}$ +107° (c.=0.5, $H_2O$).

Analysis calculated for $C_9H_{17}N_3O_7$ (percent).—C, 38.71; H, 6.14; N, 15.05. Found: C, 38.81; H, 6.31; N, 14.78.

EXAMPLE 2

800 mg. of methyl β-D-glucosaminide hydrochloride are dissolved in 20 ml. of water, and 40 ml. of acetonitrile are added to the solution. 200 mg. of methyl isocyanate and 583 mg. of silver carbonate are added to the solution. The mixture is refluxed on a water bath for an hour under heating. The reaction mixture is filtered to remove insoluble materials. The filtrate is concentrated under reduced pressure. The residual oil is recrystallized from ethanol. 555 mg. of methyl N-(N'-methyl-carbamoyl)-β-D-glucosaminide are obtained as white crystals. M.P. 239.5–241° C. Yield: 64%.

Analysis calculated for $C_9H_{18}N_2O_6$ (percent).—C, 43.19; H, 7.25; N, 11.20. Found: C, 43.34; H, 7.36; N, 11.94.

456 mg. of the crystals are dissolved in 10 ml. of water, and 3.0 ml. of glacial acetic acid are added to the solution. 4.3 ml. of an aqueous 0.5 N-sodium nitrite solution are added dropwise to the solution under ice-cooling. The solution is allowed to stand overnight in a refrigerator. Then, 5 ml. of strong cation exchange resin (H-form) (manufactured by Rohm & Haas Company under the trade name "Amberlite IR–120") are added to the solution. The mixture is stirred for 30 minutes. The ion exchange resin is removed by filtration and the filtrate is lyophilized. The crude crystals thus obtained are recrystallized from ethanol. 354 mg. of methyl N-(N'-methyl-N'-nitroso-carbamoyl)-β-D-glucosaminide are obtained as white needles. Yield: 70%. M.P. 149° C. $[\alpha]_D^{20}$ −23.7° (c.=0.5, $H_2O$).

Analysis calculated for $C_9H_{17}N_3O_7$ (percent).—C, 38.71; H, 6.14; N, 15.05. Found: C, 39.56; H, 6.56; N, 14.87.

What we claim is:
1. Methyl N-(N'-methyl-N'-nitroso-carbamoyl)-D-glucosaminide.
2. α-Anomer of the compound claimed in claim 1.
3. β-Anomer of the compound claimed in claim 1.

References Cited
UNITED STATES PATENTS 3,577,406   5/1971   Hessler _____ 260—211 R JOHNNIE R. BROWN, Primary Examiner U.S. Cl. X.R.

424—180